BINARY CODED DECIMAL COUNTER CIRCUITS
Filed July 2, 1964 4 Sheets-Sheet 1
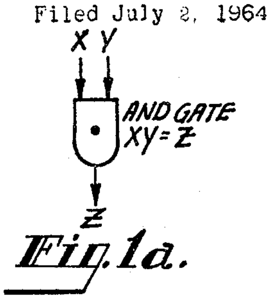
Fig. 1a.
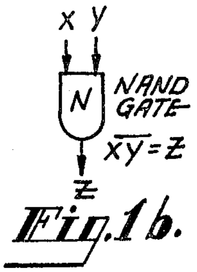
Fig. 1b.
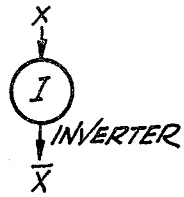
Fig. 1c.
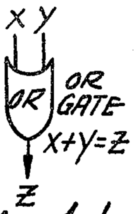
Fig. 1d.
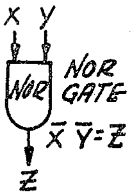
Fig. 1e.
| X | Y | AND Z | NAND Z | OR Z | NOR Z |
|---|---|---|---|---|---|
| 0 | 0 | 0 | 1 | 0 | 1 |
| 0 | 1 | 0 | 1 | 1 | 0 |
| 1 | 0 | 0 | 1 | 1 | 0 |
| 1 | 1 | 1 | 0 | 1 | 0 |
Fig. 1f.
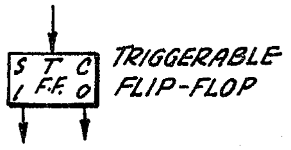
| SIGNAL APPLIED TO T. | FLIP-FLOP STATE |
|---|---|
| 1 TO 0 TRANSITION | CHANGES |
| 0 TO 1 TRANSITION | REMAINS THE SAME |
Fig. 1g.
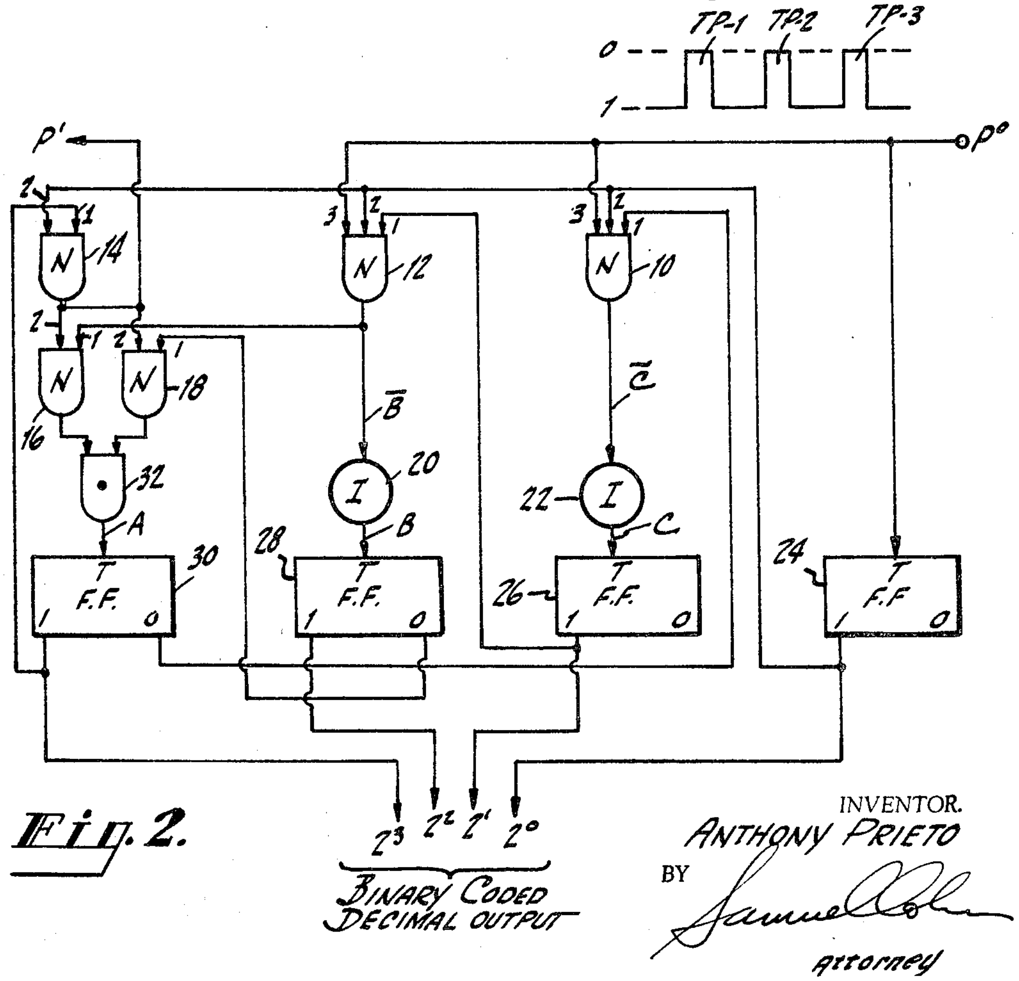
Fig. 2.
INVENTOR.
ANTHONY PRIETO
BY Samuel Cohen
Attorney INVENTOR.
ANTHONY PRIETO
BY [signature]
Attorney

BINARY CODED DECIMAL COUNTER CIRCUITS

Filed July 2, 1964 4 Sheets-Sheet 3

INVENTOR.
ANTHONY PRIETO
BY
Attorney

INVENTOR.
ANTHONY PRIETO
BY
Samuel [signature]
Attorney

United States Patent Office 3,264,567

Patented August 2, 1966

3,264,567

BINARY CODED DECIMAL COUNTER CIRCUITS

Anthony Prieto, Palm Beach Gardens, Fla., assignor to Radio Corporation of America, a corporation of Delaware Filed July 2, 1964, Ser. No. 379,815
4 Claims. (Cl. 328—45)

This invention relates to improved binary coded decimal counters.

A binary coded decimal counter includes successive stages, each with four storage elements. In the case of an up counter, for example, each stage counts to 9 and, in response to the tenth input pulse, resets to 0 and generates a carry to the succeeding stage. In some prior art counters, the various stages each include a group of auxiliary flip-flops which temporarily store the ninth count. In response to the tenth count, these flip-flops generate a reset signal for the stage and a carry signal for the following stage. Known binary coded decimal down counters employ similar circuits for temporary storage and generation of the reset and borrow signals.

An object of the present invention is to provide a circuit which is simpler than the one discussed above and which operates at relatively high speed.

In the circuit of the present invention, the auxiliary flip-flops in each stage for temporarily storing the ninth count are not employed. In the present circuit, there are logic gates connected to each two-state storage device through some of which the pulses to be counted are applied to the two-state device. These logic gates themselves sense the count produced by the counter and, when it reaches a predetermined value, automatically reset the counter and generate the carry (or borrow) for the following stage. The teachings of the invention are applicable both to up counters and to down counters.

The invention is discussed in greater detail below and is shown in the following drawings, of which:

FIGURES 1*a*–1*g* show the symbols employed for the logic circuits, such as gates, in the following figures and include also the Boolean equations and truth tables which describe the manner in which the circuits operate;

FIGURE 2 is a block circuit diagram of one form of binary coded decimal up counter;

Figure 3:
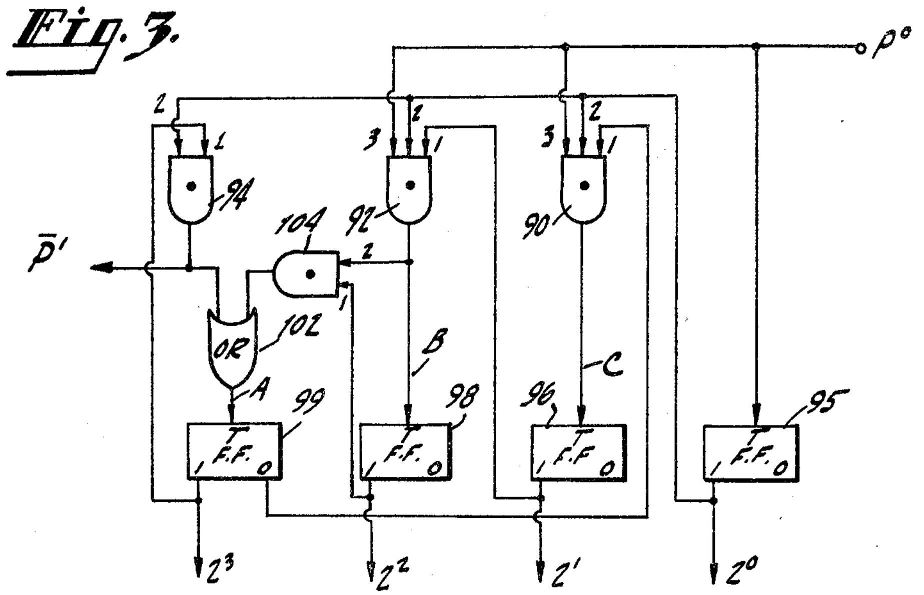
FIGURE 3 is a block circuit diagram of another embodiment of an up counter according to the invention.

Throughout the drawings, similar reference numerals are applied to similar circuit elements. Also, the numerals 1, 2 and 3 are used to designate the first, second and third inputs to the different gates to keep the charts simple.

In the circuits to be discussed, electrical signals represent binary digits, hereafter termed "bits." The convention is arbitrarily adopted that a low level signal represents the bit 1 and a high level signal represents the bit 0. For the sake of simplifying the discussion which follows, the bit itself is referred to rather than the signal manifesting the bit.

The symbols of FIGURES 1*a*–1*g* are fairly standard. The truth tables and Boolean expressions define the operation of the various circuits. With respect to the triggerable flip-flop, in the remaining figures, the set (S) terminal and the clear (C) terminal are not shown. However, it is to be understood that they are present and that any flip-flop can be made to store a 1 by applying a 1 to the set terminal and a 0 to the clear terminal, and can be made to store a 0 by applying a 1 to the clear terminal and a 0 to the set terminal. Storage of a 1 in the flip-flop is indicated by a 1 present at the 1 output terminal and a 0 present at the 0 output terminal. Storage of a 0 in the flip-flop is indicated by a 0 present at the 1 output terminal and a 1 present at the 0 output terminal.

The first stage of a binary coded decimal up counter is shown in FIGURE 2. It includes NAND gates 10, 12 and 14. NAND gate 10 applies its output $\overline{C}$ through inverter 22 to the trigger terminal T of the flip-flop 26. NAND gate 12 applies its output $\overline{B}$ through inverter 20 to the trigger terminal of the flip-flop 28. The output of NAND gate 14 serves as one input to NAND gates 16 and 18. The other input to NAND gate 16 is the output of NAND gate 12. The other input to NAND gate 18 is from the 0 output terminal of flip-flop 28. AND gate 32 receives the outputs of NAND gates 16 and 18 and applies its output to the trigger terminal of the flip-flop 30.

The operation of the circuit of FIGURE 2 succinctly is given in the following table. The following explanation of a number of the steps shown in Table 1 will help the reader to interpret the table.

Initially, a count is inserted in the four stages shown by applying appropriate signals to the set and reset terminals (not shown) of the flip-flops. However, for purposes of the present explanation, it may be assumed that the initial count is 0000 which is indicative of the decimal number 0. The conditions which then exist are those shown in the last line of the table.

The leading edge of the first $P_0$ timing pulse legended TP–1 in FIGURE 2 changes the state of flip-flop 24. This leading edge defines a 1-to-0 transition and, as is seen from FIGURE 1*g*, it is this transition that causes a change in the state of a flip-flop. The three inputs 1, 2, 3 of NAND gate 10 are then switched to 1, 1, 0 so that $\overline{C}=1$. The three inputs 1, 2, 3, of NAND gate 12 are 0, 1, 0 so that $\overline{B}=1$. The two inputs to NAND gate 14 are 0, 1 causing this NAND gate to produce a 1 output. The inputs to NAND gates 16 and 18 both are 1, 1 so that both NAND gates produce 0 outputs and A, the output of AND gate 32, is 0.

In response to the trailing edge of TP–1, that is, the 0-to-1 transition, the three inputs to NAND gate 10 become 1, 1, 1. $\overline{C}$ therefore switches from 1 to 0 and C switches fom 0 to 1. The 0-to-1 transition of C does not change the state of flip-flop 26, but places it in condition to change states.

The leading edge of the next timing pulse TP–2 changes the state of flip-flop 24 so that its output becomes 0. The three inputs to NAND gate 10 are now 1, 0, 0 so that $\overline{C}$ changes from 0 to 1 and C changes from 1 to 0. The 1-to-0 transition of C triggers flip-flop 26 changing its output from 0 to 1. Accordingly, the second timing pulse TP–2 changes the count from 0001 to 0010.

Skipping now to timing pulse 8, upon termination of this timing pulse, the count recorded in the counter is 1000. The leading edge of timing pulse TP–9 changes the count to 1001, the binary equivalent of the decimal numeral 9. This ninth pulse also causes A, the input to the last flip-flop 30, to change from 0 to 1, conditioning flip-flop 30 to be switched.

The ninth timing pulse also changes the inputs of NAND gate 14 from 0, 1 to 1, 1 thereby causing its output $P^1$ to change from 1 to 0. This 1-to-0 transition is applied to the following stage through an inverter. Accordingly, the following stage receives a 0-to-1 transition which does not change the state of the next stage.

The tenth timing pulse TP–10 switches the state of flip-flop 24 from 1 to 0. This causes $P^1$ to change from 0 to 1, causing the following stage to receive a 1-to-0 change at the output of inverter 40 of FIGURE 4. (This 1-to-0 transition may be considered the carry.) It also causes A to change from 1 to 0 triggering flip-flop 30, causing it to switch back to the 0 state.

Summarizing the operation above, the counter shown in FIGURE 2 counts the first nine input pulses it receives and produces on its four output leads legended $2^3$, $2^2$, $2^1$, and $2^0$ a binary coded decimal output. The tenth timing pulse automatically resets the flip-flops to their 0 state and causes a carry $P^1$ to be generated. This carry is applied to the following stage.

TABLE I

| | | | | | Gate 10 | | | Gate 12 | | | | | | | Gate 14 | | Gate 16 | | Gate 18 | | | | |
|---|---|---|---|---|---|---|---|---|---|---|---|---|---|---|---|---|---|---|---|---|---|---|---|
| $P_0$ | $2^3$ | $2^2$ | $2^1$ | $2^0$ | 3 | 2 | 1 | 3 | 2 | 1 | $\overline{C}$ | C | $\overline{B}$ | B | 2 | 1 | 2 | 1 | 2 | 1 | $P^1$ | A | Pulse No. |
| 1–0 | 0 | 0 | 0 | 0–1 | 1–0 | 0–1 | 1 | 1–0 | 0–1 | 0 | 1 | 0 | 1 | 0 | 0–1 | 0 | 1 | 1 | 1 | 1 | 1 | 0 | TP–1 |
| 0–1 | 0 | 0 | 0 | 1 | 0–1 | 1 | 1 | 0–1 | 1 | 0 | 1–0 | 0–1 | 1 | 0 | 1 | 0 | 1 | 1 | 1 | 1 | 1 | 0 | |
| 1–0 | 0 | 0 | 0–1 | 1–0 | 1–0 | 1–0 | 1 | 1–0 | 1–0 | 0–1 | 0–1 | 1–0 | 1 | 0 | 1–0 | 0 | 1 | 1 | 1 | 1 | 1 | 0 | TP–2 |
| 0–1 | 0 | 0 | 1 | 0 | 0–1 | 0 | 1 | 0–1 | 0 | 1 | 1 | 0 | 1 | 0 | 0 | 0 | 1 | 1 | 1 | 1 | 1 | 0 | |
| 1–0 | 0 | 0 | 1 | 0–1 | 1–0 | 0–1 | 1 | 1–0 | 0–1 | 1 | 1 | 0 | 1 | 0 | 0–1 | 0 | 1 | 1 | 1 | 1 | 1 | 0 | TP–3 |
| 0–1 | 0 | 0 | 1 | 1 | 0–1 | 1 | 1 | 0–1 | 1 | 1 | 1–0 | 0–1 | 1–0 | 0–1 | 1 | 0 | 1 | 1–0 | 1 | 1 | 1 | 0 | |
| 1–0 | 0 | 0–1 | 1–0 | 1–0 | 1–0 | 1–0 | 1 | 1–0 | 1–0 | 1–0 | 0–1 | 1–0 | 0–1 | 1–0 | 1–0 | 0 | 1 | *0–1 | 1 | *1–0 | 1 | 0 | TP–4 |
| 0–1 | 0 | 1 | 0 | 0 | 0–1 | 0 | 1 | 0–1 | 0 | 0 | 1 | 0 | 1 | 0 | 0 | 0 | 1 | 1 | 1 | 0 | 1 | 0 | |
| 1–0 | 0 | 1 | 0 | 0–1 | 1–0 | 0–1 | 1 | 1–0 | 0–1 | 0 | 1 | 0 | 1 | 0 | 0–1 | 0 | 1 | 1 | 1 | 0 | 1 | 0 | TP–5 |
| 0–1 | 0 | 1 | 0 | 1 | 0–1 | 1 | 1 | 0–1 | 1 | 0 | 1–0 | 0–1 | 1 | 0 | 1 | 0 | 1 | 1 | 1 | 0 | 1 | 0 | |
| 1–0 | 0 | 1 | 0–1 | 1–0 | 1–0 | 1–0 | 1 | 1–0 | 1–0 | 0–1 | 0–1 | 1–0 | 1 | 0 | 1–0 | 0 | 1 | 1 | 1 | 0 | 1 | 0 | TP–6 |
| 0–1 | 0 | 1 | 1 | 0 | 0–1 | 0 | 1 | 0–1 | 0 | 1 | 1 | 0 | 1 | 0 | 0 | 0 | 1 | 1 | 1 | 0 | 1 | 0 | |
| 1–0 | 0 | 1 | 1 | 0–1 | 1–0 | 0–1 | 1 | 1–0 | 0–1 | 1 | 1 | 0 | 1 | 0 | 0–1 | 0 | 1 | 1 | 1 | 0 | 1 | 0 | TP–7 |
| 0–1 | 0 | 1 | 1 | 1 | 0–1 | 1 | 1 | 0–1 | 1 | 1 | 1–0 | 0–1 | 1–0 | 0–1 | 1 | 0 | 1 | 1–0 | 1 | 0 | 1 | 0–1 | |
| 1–0 | 0–1 | 1–0 | 1–0 | 1–0 | 1–0 | 1–0 | 1–0 | 1–0 | 1–0 | 1–0 | 0–1 | 1–0 | 0–1 | 1–0 | 1–0 | 0–1 | 1 | 0–1 | 1 | 0–1 | 1 | 1–0 | TP–8 |
| 0–1 | 1 | 0 | 0 | 0 | 0–1 | 0 | 0 | 0–1 | 0 | 0 | 1 | 0 | 1 | 0 | 0 | 1 | 1 | 1 | 1 | 1 | 1 | 0 | |
| 1–0 | 1 | 0 | 0 | 0–1 | 1–0 | 0–1 | 0 | 1–0 | 0–1 | 0 | 1 | 0 | 1 | 0 | 0–1 | 1 | 1–0 | 1 | 1–0 | 1 | 1–0 | 0–1 | TP–9 |
| 0–1 | 1 | 0 | 0 | 1 | 0–1 | 1 | 0 | 0–1 | 1 | 0 | 1 | 0 | 1 | 0 | 1 | 1 | 0 | 1 | 0 | 1 | 0 | 1 | |
| 1–0 | 1–0 | 0 | 0 | 1–0 | 1–0 | 1–0 | 0–1 | 1–0 | 1–0 | 0 | 1 | 0 | 1 | 0 | 1–0 | 1–0 | 0–1 | 1 | 0–1 | 1 | 0–1 | 1–0 | TP–10 |
| 0–1 | 0 | 0 | 0 | 0 | 0–1 | 0 | 0 | 0–1 | 0 | 0 | 1 | 0 | 1 | 0 | 0 | 0 | 1 | 1 | 1 | 1 | 1 | 0 | |

1–0=1 to 0 transition. 0–1=0 to 1 transition.

*Gate 16 input changes before gate 18 input changes. Therefore, the output of gate 16 changes to 0 before the output of gate 18 changes to 1.

TABLE 2

| Pulse No. | $P^0$ | Flip-flops | | | | 90 | | | 92 | | | 94 | | 104 | | A | B | C | $\overline{P^1}$ |
|---|---|---|---|---|---|---|---|---|---|---|---|---|---|---|---|---|---|---|---|
| | | $2^3$ | $2^2$ | $2^1$ | $2^0$ | 3 | 2 | 1 | 3 | 2 | 1 | 2 | 1 | 2 | 1 | | | | |
| | 1 | 0 | 0 | 0 | 0 | 1 | 0 | 1 | 1 | 0 | 0 | 0 | 0 | 0 | 0 | 0 | 0 | 0 | 0 |
| 1 | 1–0 | 0 | 0 | 0 | 0–1 | 1–0 | 0–1 | 1 | 1–0 | 0–1 | 0 | 0–1 | 0 | 0 | 0 | 0 | 0 | 0 | 0 |
| | 0–1 | 0 | 0 | 0 | 1 | 0–1 | 1 | 1 | 0–1 | 1 | 0 | 1 | 0 | 0 | 0 | 0 | 0 | 0–1 | 0 |
| 2 | 1–0 | 0 | 0 | 0–1 | 1–0 | 1–0 | 1–0 | 1 | 1–0 | 1–0 | 0–1 | 1–0 | 0 | 0 | 0 | 0 | 0 | 1–0 | 0 |
| | 1–0 | 0 | 0 | 1 | 0 | 0–1 | 0 | 1 | 0–1 | 0 | 1 | 0 | 0 | 0 | 0 | 0 | 0 | 0 | 0 |
| 3 | 1–0 | 0 | 0 | 1 | 0–1 | 1–0 | 0–1 | 1 | 1–0 | 0–1 | 1 | 0–1 | 0 | 0 | 0 | 0 | 0 | 0 | 0 |
| | 0–1 | 0 | 0 | 1 | 1 | 0–1 | 1 | 1 | 0–1 | 1 | 1 | 1 | 0 | 0–1 | 0 | 0 | 0–1 | 0–1 | 0 |
| 4 | 1–0 | 0 | 0–1 | 1–0 | 1–0 | 1–0 | 1–0 | 1 | 1–0 | 1–0 | 1–0 | 1–0 | 0 | 1–0 | 0–1 | 0 | 1–0 | 1–0 | 0 |
| | 0–1 | 0 | 1 | 0 | 0 | 0–1 | 0 | 1 | 0–1 | 0 | 0 | 0 | 0 | 0 | 1 | 0 | 0 | 0 | 0 |
| 5 | 1–0 | 0 | 1 | 0 | 0–1 | 1–0 | 0–1 | 1 | 1–0 | 0–1 | 0 | 0–1 | 0 | 0 | 1 | 0 | 0 | 0 | 0 |
| | 0–1 | 0 | 1 | 0 | 1 | 0–1 | 1 | 1 | 0–1 | 1 | 0 | 1 | 0 | 0 | 1 | 0 | 0 | 0–1 | 0 |
| 6 | 1–0 | 0 | 1 | 0–1 | 1–0 | 1–0 | 1–0 | 1 | 1–0 | 1–0 | 0–1 | 1–0 | 0 | 0 | 1 | 0 | 0 | 1–0 | 0 |
| | 0–1 | 0 | 1 | 1 | 0 | 0–1 | 0 | 1 | 0–1 | 0 | 1 | 0 | 0 | 0 | 1 | 0 | 0 | 0 | 0 |
| 7 | 1–0 | 0 | 1 | 1 | 0–1 | 1–0 | 0–1 | 1 | 1–0 | 0–1 | 1 | 0–1 | 0 | 0 | 1 | 0 | 0 | 0 | 0 |
| | 0–1 | 0 | 1 | 1 | 1 | 0–1 | 1 | 1 | 0–1 | 1 | 1 | 1 | 0 | 0–1 | 1 | 0–1 | 0–1 | 0–1 | 0 |
| 8 | 1–0 | 0–1 | 1–0 | 1–0 | 1–0 | 1–0 | 1–0 | 1–0 | 1–0 | 1–0 | 1–0 | 1–0 | 0–1 | 1–0 | 1–0 | 1–0 | 1–0 | 1–0 | 0 |
| | 0–1 | 1 | 0 | 0 | 0 | 0–1 | 0 | 0 | 0–1 | 0 | 0 | 0 | 1 | 0 | 0 | 0 | 0 | 0 | 0 |
| 9 | 1–0 | 1 | 0 | 0 | 0–1 | 1–0 | 0–1 | 0 | 1–0 | 0–1 | 0 | 0–1 | 1 | 0 | 0 | 0–1 | 0 | 0 | 0–1 |
| | 0–1 | 1 | 0 | 0 | 1 | 0–1 | 1 | 0 | 0–1 | 1 | 0 | 1 | 1 | 0 | 0 | 1 | 0 | 0 | 1 |
| 10 | 1–0 | 1–0 | 0 | 0 | 1–0 | 1–0 | 1–0 | 0–1 | 1–0 | 1–0 | 0 | 1–0 | 1–0 | 0 | 0 | 1–0 | 0 | 0 | 1–0 |
| | 0–1 | 0 | 0 | 0 | 0 | 0–1 | 0 | 1 | 0–1 | 0 | 0 | 0 | 0 | 0 | 0 | 0 | 0 | 0 | 0 |

The circuit of FIGURE 2 employs NAND gates and inverters as these are standard components which were readily available during the circuit design. An example of another circuit embodying the invention appears in FIGURE 3. The latter circuit employs four AND gates 90, 92, 94 and 104 and one OR gate 102—a total of only five gates rather than the five NAND gates, two inverters and one AND gate—a total of eight logical elements of FIGURE 2. In addition, the circuit of FIGURE 3 has the advantage that the carry which is generated is $\overline{P}^1$ rather than $P^1$ so that inversion is not required between the first and second stages of the counter.

The operation of the circuit of FIGURE 3 is given in Table 2 above.

Figure 4:
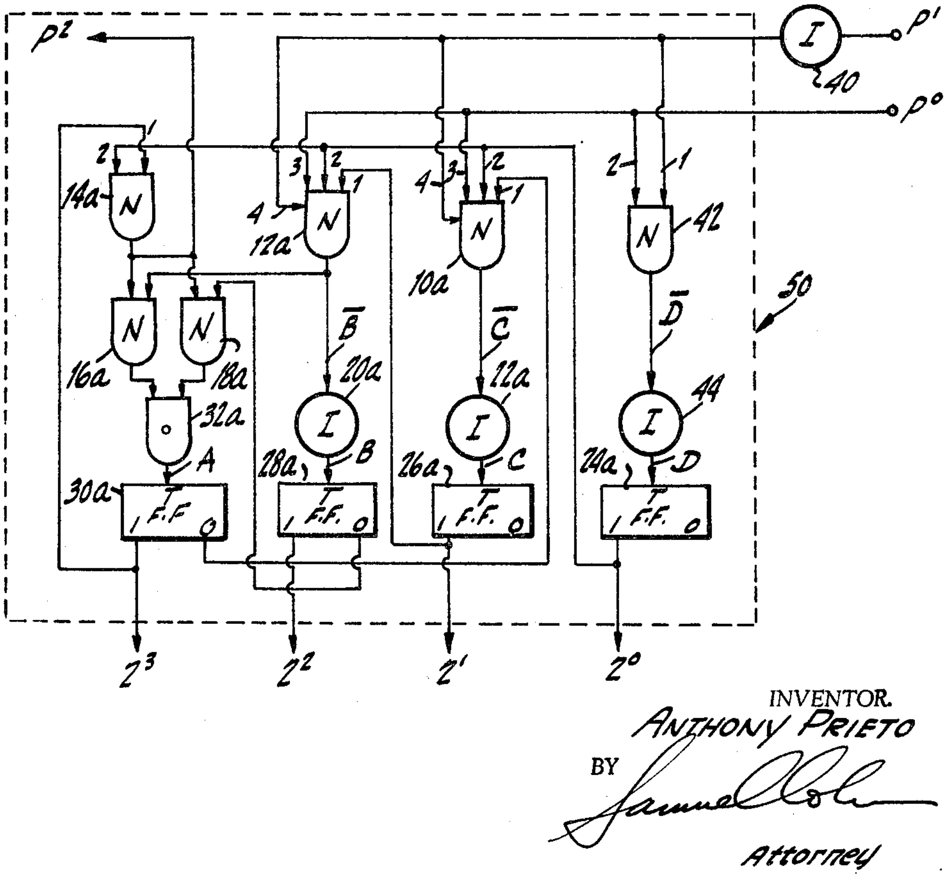
FIGURE 4 is a block circuit diagram of a second counter stage according to the invention.

The circuit of FIGURE 4 is the second ($10^1$) stage of the binary coded decimal counter, the first stage of which is shown in FIGURE 2. The circuit of FIGURE 4 includes all of the components of FIGURE 2 and also includes a NAND gate 42 and inverter 44. The inverter 44 applies its output D to the trigger terminal of the first flip-flop 24*a*. In addition, there is an inverter 40 which receives the carry output $P^1$ and supplies the inverted carry $\overline{P}^1$ to the NAND gates 42, 10*a* and 12*a*.

Figure 5:
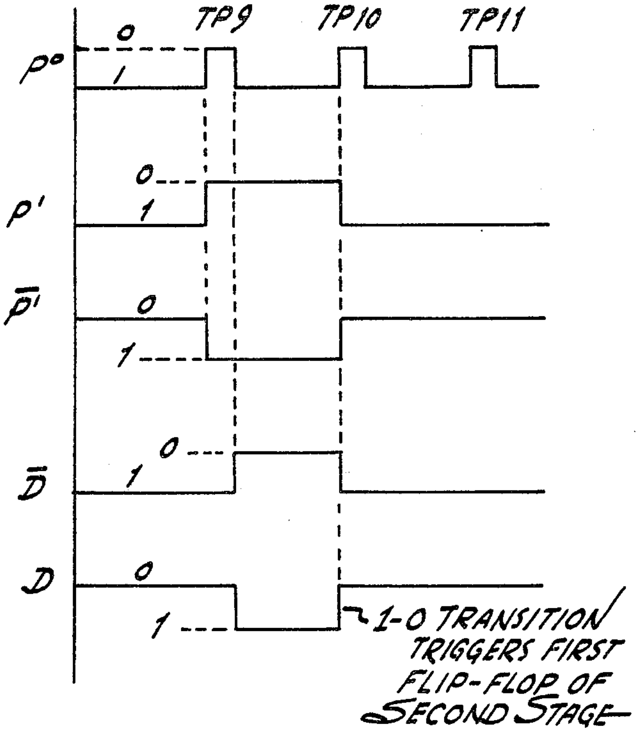
FIGURE 5 is a drawing of waveforms to help explain the operation of the circuit of FIGURE 4.

The operation of the circuit of FIGURE 4 is analogous to that of the circuit of FIGURE 1. As shown in FIGURE 5, when the ninth timing pulse occurs, $P^0$ changes from 1 to 0 and $P^1$ changes from 1 to 0. $\overline{D}$, the output of NAND gate 42, is therefore 1 and D is 0. In response to the 0-to-1 transition of the trailing edge of timing pulse TP–9, the inputs to NAND gate 42 change to 1, 1. This causes $\overline{D}$ to switch from 1 to 0 and D to switch from 0 to 1. The $D=1$ applied to the trigger terminal of flip-flop 24*a* conditions the flip-flop to change its state.

the count initially in the 10 stage of the counter is 0000, the count thereupon advances to 0001. Each subsequent tenth timing pulse $P^0$ causes the count stored in the second stage of the counter also to advance by one.

Figure 6:
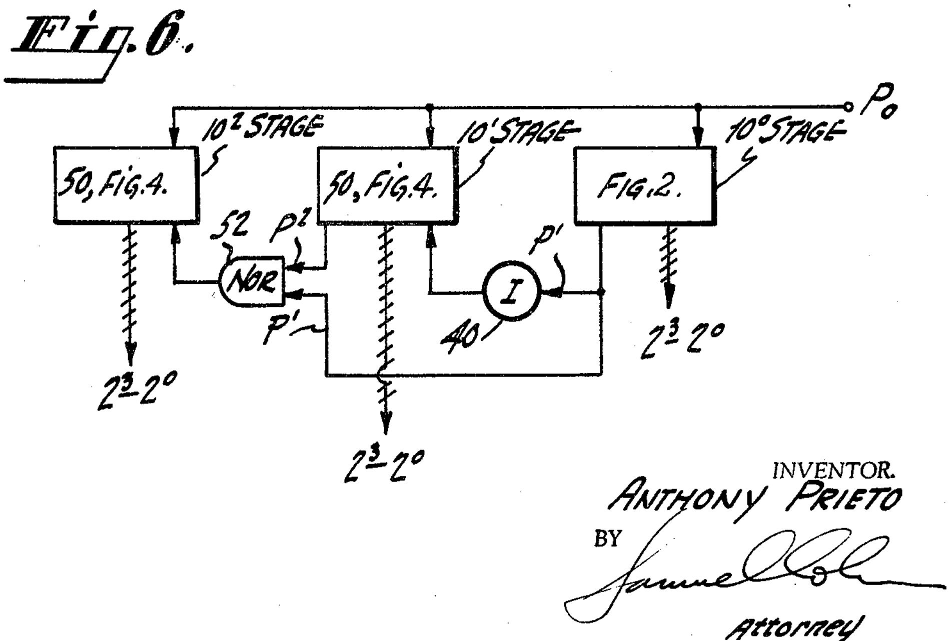
FIGURE 6 is a block circuit diagram of three stages of a binary coded decimal counter according to the invention.

FIGURE 6 shows three stages of the counter according to the invention. The first and second stages have already been discussed. The third or $10^2$ stage is exactly the same as the $10^1$ stage. However, a NOR gate 52 is substituted for inverter 40. This NOR gate receives the carry outputs $P^1$ and $P^2$ of the first and second stages, respectively. Each time both of these carries become equal to 0, the NOR gate 52 produces a 1 output. Thereafter, when one of the inputs $P^1$ or $P^2$ changes back to 1, the NOR gate produces a 1-to-0 transition which conditions the gates of the third stage to be triggered by the $P^0$ trigger pulses.

Figure 7:
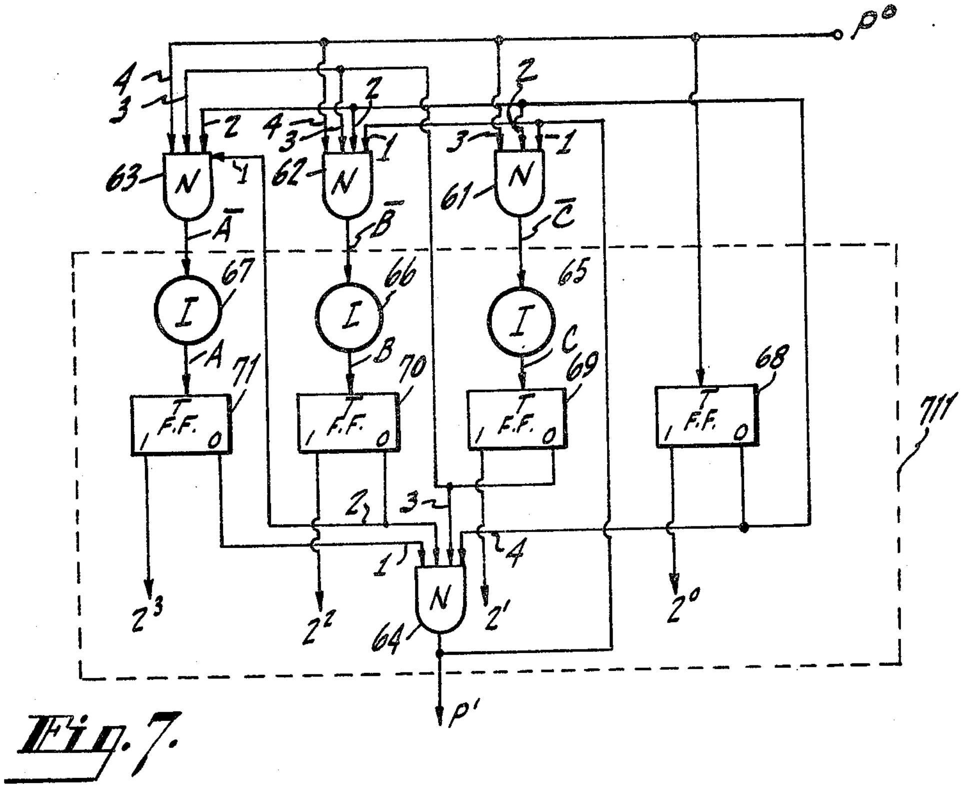
FIGURE 7 is a block circuit diagram of a binary coded decimal down counter according to the invention.

FIGURE 7 illustrates the first stage of a count-down binary coded decimal counter. It includes three NAND gates 61, 62 and 63 and three inverters 65, 66 and 67. The circuit also includes four flip-flops 68, 69, 70 and 71 and a NAND gate 64 connected to the 0 output terminals of the flip-flops. NAND gate 64 produces the borrow output $P^1$ which is applied to the following stage and is also employed to reset the counter to its original condition. The operation of the counter of FIGURE 7 is set forth in the following Table 3. If the assumption made is that the count initially stored is 0000, as set forth in the first line of the table, the first input pulse changes the count to 1001, the binary coded equivalent of 9, and borrows from the tenth stage. Each succeeding pulse reduces the count by one, until the ninth pulse is reached. The ninth pulse causes the count 0001 to be produced. The tenth pulse resets the count to 0000 and produces a borrow condition which will allow any additional trigger pulse to borrow from the tenth stage.

TABLE 3

| | | | | | | Gate 61 | | | | | Gate 62 | | | | | | | | Gate 63 | | | | |
|---|---|---|---|---|---|---|---|---|---|---|---|---|---|---|---|---|---|---|---|---|---|---|---|
| Pulse No. | $P_0$ | $2^3$ | $2^2$ | $2^1$ | $2^0$ | 3 | 2 | 1 | $\overline{C}$ | C | 4 | 3 | 2 | 1 | $\overline{B}$ | B | $\overline{A}$ | A | 4 | 3 | 2 | 1 | $P^1$ |
| | 1 | 0 | 0 | 0 | 0 | 1 | 1 | 0 | 1 | 0 | 1 | 1 | 1 | 0 | 1 | 0 | 0 | 1 | 1 | 1 | 1 | 1 | 0 |
| 1 | 1–0 | 0–1 | 0 | 0 | 0–1 | 1–0 | 1–0 | 0–1 | 1 | 0 | 1–0 | 1 | 1–0 | 0–1 | 1 | 0 | 0–1 | 1–0 | 1–0 | 1 | 1–0 | 1 | 0–1 |
| | 0–1 | 1 | 0 | 0 | 1 | 0–1 | 0 | 1 | 1 | 0 | 0–1 | 1 | 0 | 1 | 1 | 0 | 1 | 0 | 0–1 | 1 | 0 | 1 | 1 |
| 2 | 1–0 | 1 | 0 | 0 | 1–0 | 1–0 | 0–1 | 1 | 1 | 0 | 1–0 | 1 | 0–1 | 1 | 1 | 0 | 1 | 0 | 1–0 | 1 | 0–1 | 1 | 1 |
| | 0–1 | 1 | 0 | 0 | 0 | 0–1 | 1 | 1 | 1–0 | 0–1 | 0–1 | 1 | 1 | 1 | 1–0 | 0–1 | 1–0 | 0–1 | 0–1 | 1 | 1 | 1 | 1 |
| 3 | 1–0 | 1–0 | 0–1 | 0–1 | 0–1 | 1–0 | 1–0 | 1–9 | 0–1 | 1–0 | 1–0 | 1–0 | 1–0 | 1 | 0–1 | 1–0 | 0–1 | 1–0 | 1–0 | 1–0 | 1–0 | 1–0 | 1 |
| | 0–1 | 0 | 1 | 1 | 1 | 0–1 | 0 | 1 | 1 | 0 | 0–1 | 0 | 0 | 1 | 1 | 0 | 1 | 0 | 0–1 | 0 | 0 | 0 | 1 |
| 4 | 1–0 | 0 | 1 | 1 | 1–0 | 1–0 | 0–1 | 1 | 1 | 0 | 1–0 | 0 | 0–1 | 1 | 1 | 0 | 1 | 0 | 1–0 | 0 | 0–1 | 0 | 1 |
| | 0–1 | 0 | 1 | 1 | 0 | 0–1 | 1 | 1 | 1–0 | 0–1 | 0–1 | 0 | 1 | 1 | 1 | 0 | 1 | 0 | 0–1 | 0 | 1 | 0 | 1 |
| 5 | 1–0 | 0 | 1 | 1–0 | 0–1 | 1–0 | 1–0 | 1 | 0–1 | 1–0 | 1–0 | 0–1 | 1–0 | 1 | 1 | 0 | 1 | 0 | 1–0 | 0–1 | 1–0 | 0 | 1 |
| | 0–1 | 0 | 1 | 0 | 1 | 0–1 | 0 | 1 | 1 | 0 | 0–1 | 1 | 0 | 1 | 1 | 0 | 1 | 0 | 0–1 | 1 | 0 | 0 | 1 |
| 6 | 1–0 | 0 | 1 | 0 | 1–0 | 1–0 | 0–1 | 1 | 1 | 0 | 1–0 | 1 | 0–1 | 1 | 1 | 0 | 1 | 0 | 1–0 | 1 | 0–1 | 0 | 1 |
| | 0–1 | 0 | 1 | 0 | 0 | 0–1 | 1 | 1 | 1–0 | 0–1 | 0–1 | 1 | 1 | 1 | 1–0 | 0–1 | 1 | 0 | 0–1 | 1 | 1 | 0 | 1 |
| 7 | 1–0 | 0 | 1–0 | 0–1 | 0–1 | 1–0 | 1–0 | 1 | 0–1 | 1–0 | 1–0 | 1–0 | 1–0 | 1 | 0–1 | 1–0 | 1 | 0 | 1–0 | 1–0 | 0–1 | 0–1 | 1 |
| | 0–1 | 0 | 0 | 1 | 1 | 0–1 | 0 | 1 | 1 | 0 | 0–1 | 0 | 0 | 1 | 1 | 0 | 1 | 0 | 0–1 | 0 | 0 | 1 | 1 |
| 8 | 1–0 | 0 | 0 | 1 | 1–0 | 1–0 | 0–1 | 1 | 1 | 0 | 1–0 | 0 | 0–1 | 1 | 1 | 0 | 1 | 0 | 1–0 | 0 | 0–1 | 1 | 1 |
| | 0–1 | 0 | 0 | 1 | 0 | 0–1 | 1 | 1 | 1–0 | 0–1 | 0–1 | 0 | 1 | 1 | 1 | 0 | 1 | 0 | 0–1 | 0 | 1 | 1 | 1 |
| 9 | 1–0 | 0 | 0 | 1–0 | 0–1 | 1–0 | 1–0 | 1 | 0–1 | 1–0 | 1–0 | 0–1 | 1–0 | 1 | 1 | 0 | 1 | 0 | 1–0 | 0–1 | 1–0 | 1 | 1 |
| | 0–1 | 0 | 0 | 0 | 1 | 0–1 | 0 | 1 | 1 | 0 | 0–1 | 1 | 0 | 1 | 1 | 0 | 1 | 0 | 0–1 | 1 | 0 | 1 | 1 |
| 10 | 1–0 | 0 | 0 | 0 | 1–0 | 1–0 | 0–1 | 1–0 | 1 | 0 | 1–0 | 1 | 0–1 | 1–0 | 1 | 0 | 1 | 0 | 1–0 | 1 | 0–1 | 1 | 1–0 |
| | 0–1 | 0 | 0 | 0 | 0 | 0–1 | 1 | 0 | 1 | 0 | 0–1 | 1 | 1 | 0 | 1 | 0 | 1–0 | 0–1 | 0–1 | 1 | 1 | 1 | 0 |

Figure 8:
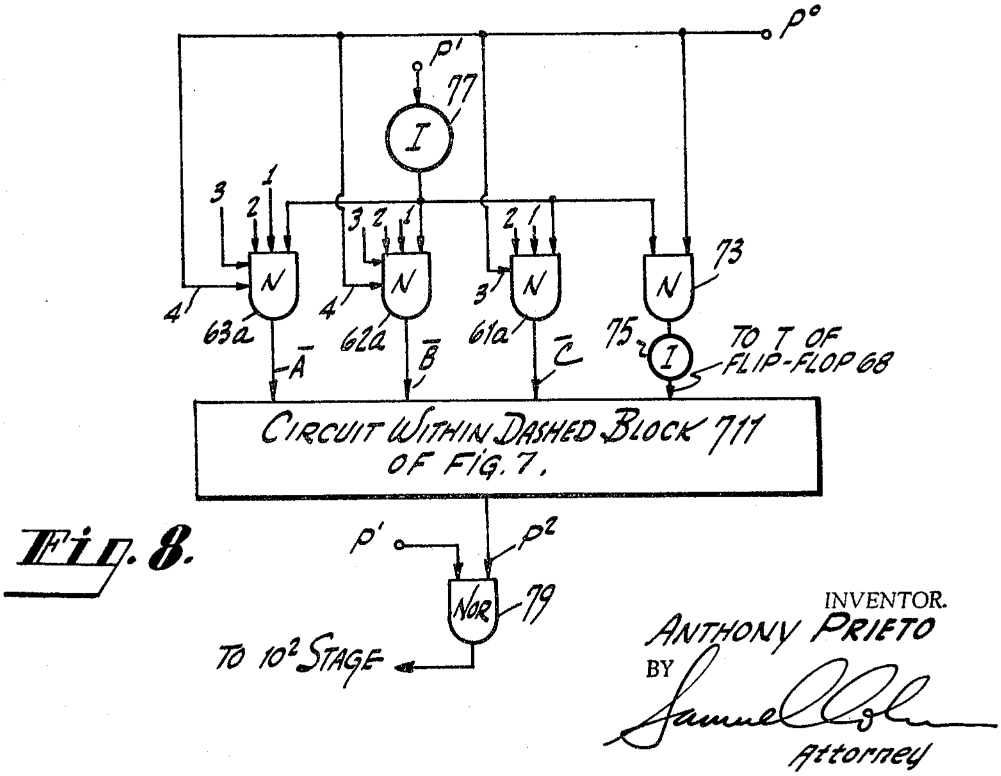
FIGURE 8 is a block circuit diagram of the second ($10^2$) stage of the binary coded decimal down counter.

When the leading edge of the next timing pulse TP–10 occurs, the inputs to NAND gate 42 change to 0, 0 so that D changes from 1 back to 0. This 1-to-0 transition triggers flip-flop 24*a*, causing it to change its state. If The second stage of the count-down counter is shown in FIGURE 8. It includes, in addition to the circuit elements of FIGURE 7, an additional NOR gate 73 and inverter 75. The output of the inverter goes to the trigger terminal of the first flip-flop 68. The borrow input $P^1$ is applied through an inverter 77 to the NAND gates 63*a*, 62*a*, 61*a* and 73. The borrow output $P^2$ of the second stage is applied to a NOR gate 79. The second input to the NOR gate is the borrow $P^1$ generated by the first or $10^0$ stage. The NOR gate 79 at the input to the third stage performs a function analogous to that of the inverter 77 located at the input to the second stage. The output of NOR gate 79 is applied to the NAND gates corresponding to 63*a*, 62*a*, 61*a* and 73 of the third or $10^2$ stage.

While not illustrated, it is to be understood that other embodiments are possible of the binary coded decimal count-down counter of FIGURES 7 and 8. For example, AND and OR gates may be employed rather than NAND gates and inverters, in a manner similar to that shown for the up counter. By the same token, the second, third and higher order stages of the count-up counter of FIGURES 4 and 6 may be designed in accordance with the teachings of FIGURE 3.

In the claims which follow, the term "carry" is employed in the generic sense to refer to the output of a counter stage, either count-down or count-up, which is employed to trigger the following counter stage.

What is claimed is:

1. A stage of a binary coded decimal counter comprising, in combination:

four two-state devices for storing the $2^0$, $2^1$, $2^2$ and $2^3$ bits, respectively, of a binary coded decimal number;

first, second and third logic circuits, connected to the $2^1$, $2^2$ and $2^3$ two-state devices, respectively, for applying triggering signals to said devices, and said third logic circuits for also producing a carry signal;

means for applying the pulses to be counted to the $2^0$ two-state device, and the first and second logic circuits;

means for applying an output of the $2^0$ two-state device to all three logic circuits;

means for applying an output of the $2^1$ two-state device to the second logic circuit;

means for applying an output of the $2^2$ two-state device to the third logic circuit;

means for applying one output of the $2^3$ two-state device to the third logic circuit and the complement of said output to the first logic circuit; and means for applying an output from the second logic circuit to the third logic circuit.

2. A stage as set forth in claim 1 wherein all of said logic circuits include at least one NAND gate.

3. A stage as set forth in claim 2 wherein said third logic circuit comprises three NAND gates and an AND gate.

4. A stage of a binary coded decimal counter comprising, in combination:

four two-state devices for storing the $2^0$, $2^1$, $2^2$ and $2^3$ bits, respectively of a binary coded decimal number;

first, second, third and fourth logic circuits, connected to the $2^0$, $2^1$, $2^2$ and $2^3$ two-state devices, respectively, for applying triggering signals to said devices, and said fourth logic circuit for also producing a carrying signal;

means for applying the pulses to be counted to the first, second and third logic circuits;

means for applying an output of the $2^0$ two-state device to the second, third and fourth logic circuits;

means for applying an output of the $2^1$ two-state device to the third logic circuit;

means for applying an output of the $2^2$ two-state device to the fourth logic circuit;

means for applying one output of the $2^3$ two-state device to the fourth logic circuit and the complement of said output to the second logic circuit; and means for applying an output from the third logic circuit to the fourth logic circuit.

References Cited by the Examiner

UNITED STATES PATENTS

| | | | |
|---|---|---|---|
| 2,889,468 | 6/1959 | Crosby | 307—88.5 |
| 3,183,369 | 5/1965 | Lauer | 307—88.5 |

ARTHUR GAUSS, *Primary Examiner.*

JOHN W. HUCKERT, *Examiner.*

J. ZAZWORSKY, *Assistant Examiner.*